(12) United States Patent
Pohill et al.

(10) Patent No.: US 6,588,781 B2
(45) Date of Patent: Jul. 8, 2003

(54) VEHICLE SIDE STEP ASSEMBLY

(75) Inventors: John W Pohill, Brighton, MI (US);
John S Kargilis, Northville, MI (US);
David W Pennala, Howell, MI (US);
Shawn A Sterling, Livonia, MI (US)

(73) Assignee: DaimlerChrysler Corporation, Auburn-Hills, MI (US)

( * ) Notice: Subject to any disclaimer, the term of this patent is extended or adjusted under 35 U.S.C. 154(b) by 0 days.

(21) Appl. No.: 09/748,640

(22) Filed: Dec. 22, 2000

(65) Prior Publication Data

US 2002/0079667 A1 Jun. 27, 2002

(51) Int. Cl.[7] .................................................. B60R 3/00
(52) U.S. Cl. ....................................................... 280/163
(58) Field of Search .............................. 280/163, 164.1, 280/164.2, 166, 169, 154, 848; 403/335, 336, 337, 355, 363

(56) References Cited

U.S. PATENT DOCUMENTS

| | | | | |
|---|---|---|---|---|
| 1,290,522 A | * | 1/1919 | Dean et al. .................. 280/163 |
| 1,499,962 A | * | 7/1924 | Barnes ........................ 403/336 |
| 1,680,504 A | * | 8/1928 | Cutler ......................... 280/848 |
| 1,698,005 A | * | 1/1929 | Stanwood ................. 280/164.2 |
| 3,312,443 A | * | 4/1967 | Levigne ...................... 403/363 |
| 3,408,665 A | * | 11/1968 | Harris ......................... 403/363 |
| 3,887,217 A | * | 6/1975 | Thomas ...................... 280/166 |
| 3,951,431 A | | 4/1976 | Hopkins ..................... 280/166 |
| 3,967,695 A | | 7/1976 | Waddell ....................... 182/86 |
| 3,968,624 A | * | 7/1976 | Allmendinger ............. 403/363 |
| 4,017,093 A | | 4/1977 | Stecker, Sr. ................. 280/163 |
| 4,106,790 A | | 8/1978 | Weiler ........................ 280/166 |
| 4,314,432 A | * | 2/1982 | Rosenbaum ................ 403/363 |
| D316,394 S | | 4/1991 | Carr .......................... D12/203 |
| 5,022,679 A | * | 6/1991 | Pazik ....................... 280/164.1 |
| 5,137,390 A | * | 8/1992 | Felsen ........................ 403/355 |
| 5,139,295 A | | 8/1992 | Escobedo .................... 293/117 |
| 5,193,829 A | * | 3/1993 | Holloway et al. .......... 280/163 |
| 5,224,723 A | | 7/1993 | Hatas ......................... 280/166 |
| 5,265,896 A | | 11/1993 | Kravitz ....................... 280/163 |
| 5,286,049 A | * | 2/1994 | Khan .......................... 280/163 |
| 5,358,268 A | | 10/1994 | Hawkins ..................... 280/166 |
| 5,498,012 A | | 3/1996 | McDaniel et al. .......... 280/166 |
| 5,538,269 A | | 7/1996 | McDaniel et al. .......... 280/166 |
| D381,948 S | | 8/1997 | Schult ....................... D12/203 |
| D384,020 S | | 9/1997 | Snyder et al. ............. D12/203 |
| 5,673,881 A | * | 10/1997 | Minchey et al. ............ 403/337 |
| 5,713,589 A | | 2/1998 | Delgado et al. ............ 280/163 |
| D397,979 S | | 9/1998 | Graneto, III ............... D12/203 |
| 5,813,791 A | * | 9/1998 | Kubota ....................... 403/335 |
| 5,895,064 A | * | 4/1999 | Laubach ..................... 280/163 |
| 5,951,197 A | * | 9/1999 | Wu ............................. 403/363 |
| 6,050,579 A | * | 4/2000 | Selland et al. .............. 280/163 |
| 6,267,398 B1 | * | 7/2001 | Lombard .................... 280/163 |

FOREIGN PATENT DOCUMENTS

JP         59-32535    *  2/1984   ................. 280/166

OTHER PUBLICATIONS exemplary step plates, "Motor Vehicle Monthly", vol. 59, No. 9, Dec. 1923, single sheet, page not marked.*

* cited by examiner

*Primary Examiner*—Frank Vanaman
(74) *Attorney, Agent, or Firm*—Ralph E. Smith

(57) ABSTRACT

A vehicle step assembly which easily mounts to and removes from a motor vehicle and includes a main body portion and a pair of mounting brackets. The main body portion defines a step surface. The assembly further includes fasteners for attaching the main body portion to the mounting brackets as well as the brackets to the vehicle body or frame. The brackets attach to the vehicle through a downwardly facing tab and removable fasteners. The fasteners secure the bracket to the body or frame. The downwardly facing tabs help to carry and allow for easy installation and removal.

12 Claims, 3 Drawing Sheets

VEHICLE SIDE STEP ASSEMBLY

BACKGROUND OF THE INVENTION

1. Technical Field

The present invention generally pertains to motor vehicles. More particular, the present invention pertains to a vehicle side step. More specifically, but without restriction to the particular embodiment and/or use which is shown and described for purposes of illustration, the present invention relates to a vehicle side step which comprises a pair of brackets and a step.

2. Discussion

Many conventional and modified vehicles have elevated chassis. An example of such a vehicle are "off-road" four wheel drive vehicles in which the chassis is elevated for ground clearance purposes. Such vehicles, and others having elevated chassis make vehicle ingress difficult. As a solution to this problem, fixed steps have been mounted to the vehicle body or chassis to provide a lower step height to the passenger compartment of the vehicle.

Presently, vehicles generally employ two distinct styles of side steps. The first style includes a tubular member formed in a U-shape with flange portions at both ends. The tubular member is permanently attached to the chassis by use of fasteners or weldment at the flange. The second style comprises an elongated steel frame covered with a plastic or metal shell for aesthetic purposes. The frame is attached to the chassis by use of brackets at multiple locations.

While known side steps for motor vehicles have proven commercially acceptable for their intended purpose, they are all subject to improvement. In this regard, inclusion of either of these types of permanently mounted steps effectively lowers the elevation of the vehicle. The reduced ground clearance of the vehicle may also cause damage to the vehicle or side steps. In off-road applications it is known that uneven terrain may cause the vehicle chassis to contact the ground or other objects.

Thus, it remains desirable in the pertinent art to provide a vehicle side step that is removable for purposes of traversing uneven terrain, therefore eliminating the possibility of damaging the side steps.

SUMMARY OF THE INVENTION

It is a general object of the present invention to provide a step assembly for a vehicle that is easily removed and installed. The step assembly of the present invention can be taken off for off-roading to prevent damage from terrain and installed afterward to provide an aid for ingress to the vehicle.

It is another object of the present invention to reduce the number and complexity of parts that are used together to form a side step assembly. The reduction in parts and complexity will reduce the cost of the unit as well as the time required to attach the side steps to the vehicle at the assembly plant.

It is a further object of the present invention to produce a side step assembly that has increased strength and reduced load deflection as compared to the known side step assemblies.

In one form, the present invention provides a step assembly for attachment to a motor vehicle structural member. The step assembly includes a step having a generally planar step surface and a pair of support assemblies connected to the step. Each support assembly has a first end including a flange portion and a downwardly facing tab. The flange portion is oriented substantially perpendicular to the planar step surface and is adapted to be removably secured to the motor vehicle. The downwardly facing tab locates and secures the flange portion to the motor vehicle.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
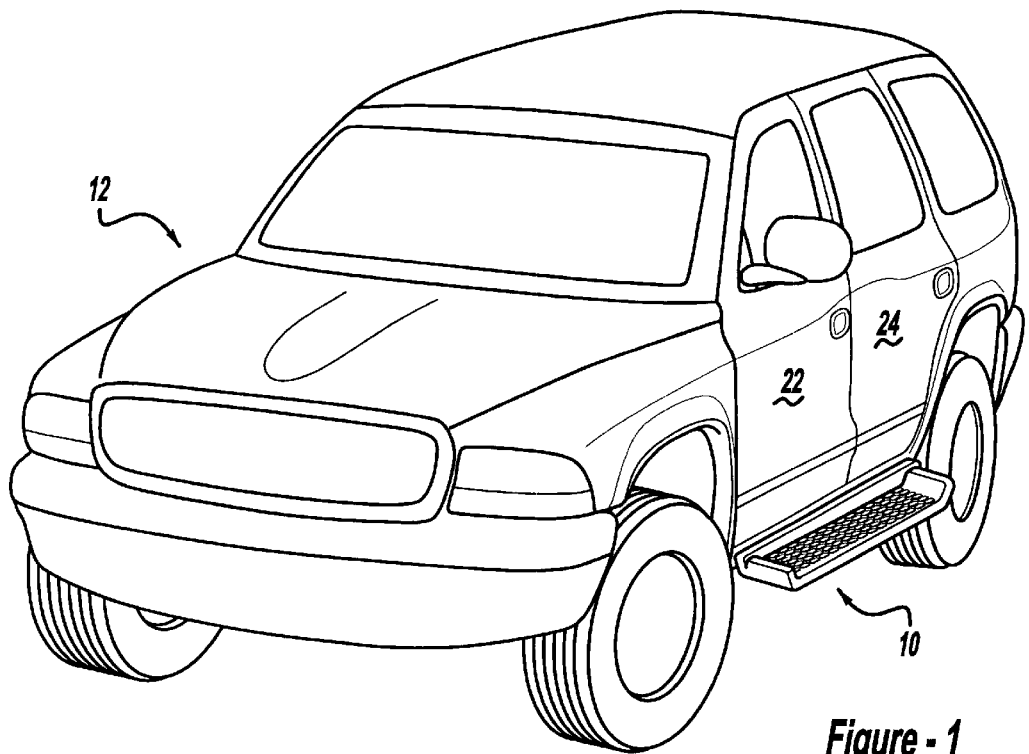
FIG. 1 is a perspective view of a vehicle side step assembly constructed in accordance with the teachings of a preferred embodiment of the present invention, the vehicle side step assembly shown operatively attached to an exemplary motor vehicle.
Figure 2:
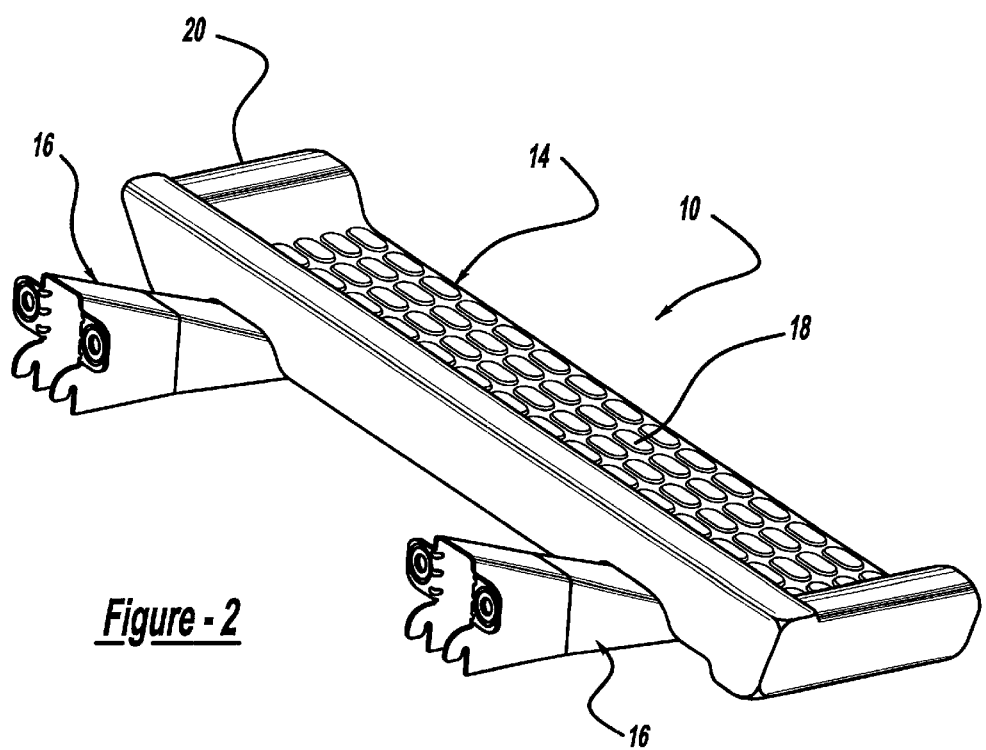
FIG. 2 is a perspective view of the vehicle side step assembly shown removed from the exemplary motor vehicle for purposes of illustration.
Figure 3:
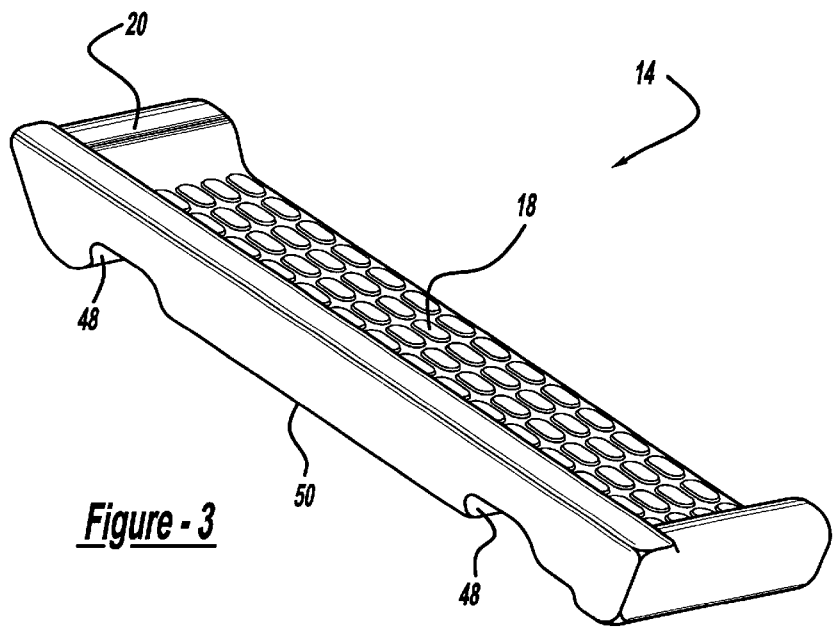
FIG. 3 is a perspective view of the step of the step assembly.

With initial reference to FIG. 1, a vehicle side step assembly constructed in accordance with the teachings of a preferred embodiment of the present invention is illustrated and generally identified at reference number 10. The vehicle side step assembly is shown operatively associated with a motor vehicle 12. It will be understood by those skilled in the art that the particular motor vehicle 12 shown in the drawings is merely exemplary and that the teachings of the present invention are equally applicable to various other types of vehicles. The vehicle step assembly 10 generally functions to provide a stepping platform having a lower elevation than the opening for a passenger compartment of the motor vehicle 12, thereby providing for easier ingress to and egress from the passenger compartment.

With continued reference to the environmental view of FIG. 1 and additional reference to FIGS. 2–5, the side step assembly 10 of the present invention will be further described. The side step assembly 10 is illustrated to generally include a main body portion 14 and a pair of support brackets or mounting brackets 16. In the preferred embodiment, the support brackets 16, which will be described further below, are identical and therefore interchangeable.

In the exemplary embodiment illustrated, the main body portion 14 is unitarily constructed of a plastic injection molded material or other material of suitable strength and durability characteristics. The main body portion 14 is shown to include a generally planar step surface 18 which, in the preferred embodiment, has a textured surface to prevent slip. The main body portion 14 further includes an upwardly extending lip 20 around a portion of a perimeter of an upper surface of the main body portion 14. In the preferred embodiment, the lip 20 extends substantially the entire length of three sides of the perimeter of the main body portion 14. The main body portion is elongated in a direction parallel to the longitudinal axis of the motor vehicle 12 and provides a step surface for gaining an access to or leaving the passenger compartment of the motor vehicle 12 through either a front passenger door 22 or a rear passenger door 24.

Figure 4:
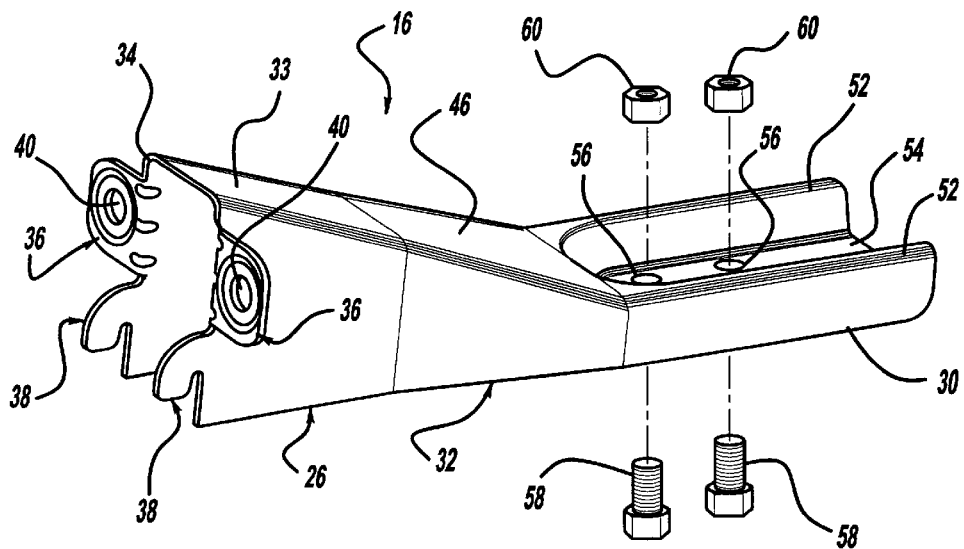
FIG. 4 is a perspective view of one of the support assemblies of the step assembly.
Figure 5:
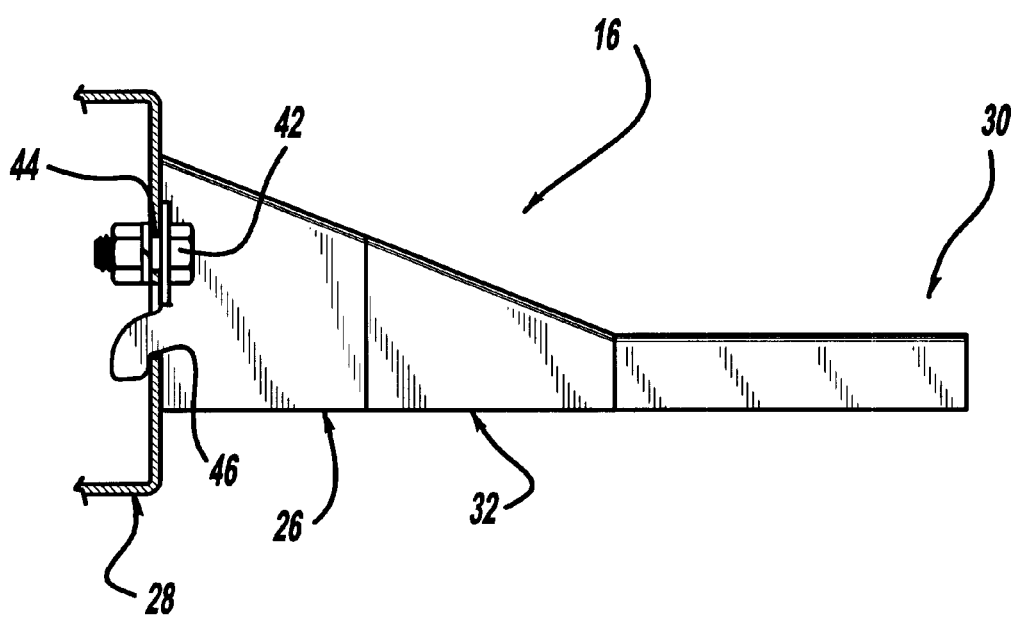
FIG. 5 is a cross-sectional view illustrating attachment of the step assembly to a frame member of the motor vehicle.

As shown perhaps most particularly in the enlarged perspective view of FIG. 4, and the partial cross section sectional view of FIG. 5, each support bracket 16 is illustrated to generally include a first portion 26 for attachment to a structural member 28 of the motor vehicle 12. Each support bracket 16 is additionally shown to generally include a second portion 30 for attachment to the main body portion 14. Further, each support bracket 16 is illustrated to generally include an intermediate portion 32 interbetween the first portion 26 and the second portion 30. In the preferred embodiment, each of the support brackets 16 is unitarily stamped from a metal sheet. However, those skilled in the art will readily appreciate that other suitable materials and forming techniques may be employed.

The first portion 26 of each bracket assembly 16 has a generally U-shaped cross section and includes an upper surface 33 which tapers from a free end 34 of the first portion 26 to adjacent the intermediate portion 32. The first portion 26 is formed to include a pair of mounting flanges 36 and a pair of downwardly extending tabs 38. Each mounting flange defines an aperture 40 for receiving a threaded fastener 42. The threaded fastener passes through an aperture 44 provided in the structural member 28. In the preferred embodiment, the structural member is a longitudinally extending rail of the motor vehicle 12. The downwardly extending tabs 38 are inserted into corresponding slots 46 provided in the structural member 28. In operation, the mounting brackets 16 are releasably attached to the structural member 28 by first engaging the downwardly extending tabs 38 with the corresponding slots 46 and next securing the mounting flanges 36 to the structural member 28 with the threaded fasteners 42.

Similar to the first portion 26, the intermediate portion 32 of each of the mounting brackets 16 is generally U-shaped in cross section and includes an upper surface 46 which tapers. The upper surface 46 tapers from adjacent the first portion 26 to adjacent the second portion 30. A portion of the intermediate portion 32 and the second portion 30 of each of the mounting brackets 16 is received within corresponding channels 48 provided in an underside 50 of the main body portion 14.

The second portion 30 of each of the mounting brackets 16 includes a pair of rail segments 52. Each of the rail segments has a generally U-shaped cross section which opens downwardly. The configuration of the rail segments provides additional strength to resist bending when a load is received by the main body portion 14. The second portion 30 of each of the mounting brackets 16 further includes a horizontal segment 54 interbetween the rail segments 52. The horizontal segment 54 defines a pair of apertures 56. The apertures receive threaded fasteners 58 which engage nuts 60 secured to the underside 50 of the main body portion 14.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A step assembly for attachment to a structural member of a motor vehicle, the step assembly comprising:

a main body portion having a generally planar step surface; and a pair of support brackets, each having a first portion with a free end including a flange portion oriented substantially perpendicular to the planar step surface and adapted to be removably secured to the structural member of the motor vehicle, and a downwardly facing tab for locating the flange portion relative to the structural member of the motor vehicle, a second portion having a pair of rail segments each having a downwardly opening generally U-shaped gross section, the pair of rail segments joined by a horizontal segment secured to the main body portion, and an intermediate portion connecting the first and second portions and tapering therebetween;

wherein the main body portion includes an underside defining a pair of channels, each channel shaped to receive all of the second portion and a part of the intermediate portion of an associated one of the support brackets.

2. The step assembly for attachment to a motor vehicle structural member of claim 1, wherein the main body portion includes an upwardly extending lip along a portion of a perimeter of an upper surface.

3. The step assembly for attachment to a motor vehicle structural member of claim 2, wherein the lip extends substantially the entire length of three sides of the perimeter.

4. The step assembly for attachment to a motor vehicle structural members of claim 1, wherein the flange portion of each support bracket is formed to include a pair of mounting flanges each defining an aperture for receiving a fastener.

5. The step assembly for attachment to a motor vehicle structural member of claim 1 wherein the first portion of each support bracket includes a pair of downwardly facing tabs.

6. The step assembly for attachment to a motor vehicle structural member of claim 1, wherein the intermediate portion of each support bracket has a generally U-shaped cross section.

7. In combination with a motor vehicle having a structural member, a step assembly removably secured to the structural member, the step assembly comprising:

a main body portion having a step defining a generally planar step surface; and a pair of support assemblies, each having a distal end including a flange portion oriented substantially perpendicular to the planar step surface and secured to the structural member, and a downwardly facing tab to locate the flange portion relative to the structural member of the motor vehicle, a second portion having a pair of rail segments each having a downwardly opening generally U-shaped cross section, the pair of rail segments joined by a horizontal segment secured to the main body portion, and an intermediate portion connecting the first and second portions and tapering therebetween;

wherein the main body portion includes an underside defining a pair of channels, each channel shaped to receive all of the second portion and a part of the intermediate portion of an associated one of the support assemblies.

8. The combination of claim 7, wherein the main body portion includes an upwardly extending lip along a perimeter of an upper surface.

9. The combination of claim 8, wherein the lip extends substantially the entire length of three sides of the perimeter.

10. The combination of claim 7, wherein the first portion of each support assembly is formed to include a pair of mounting flanges each defining an aperture for receiving a fastener.

11. The combination of claim 7, wherein the first portion of each support assembly includes a pair of downwardly facing tabs.

12. The combination of claim 7, wherein the intermediate portion of each support assembly has a generally U-shaped cross section.

* * * * *